United States Patent [19]
Hoeptner, III et al.

[11] Patent Number: 5,553,636
[45] Date of Patent: Sep. 10, 1996

[54] WATERING THROUGH FILL VALVE CONTROL

[75] Inventors: Herbert W. Hoeptner, III, 15085 Venetian Way, Morgan Hill, Calif. 95037; Herbert W. Hoeptner, Jr.; Rahl E. Hoeptner, both of Eagle Point, Oreg.

[73] Assignee: Herbert W. Hoeptner, III, Morgan Hill, Calif.

[21] Appl. No.: 262,558

[22] Filed: Jun. 20, 1994

[51] Int. Cl.[6] .......................... F16K 31/70; F16K 31/22; F16K 33/00

[52] U.S. Cl. .................. 137/59; 119/73; 119/78; 119/79; 137/426; 137/448; 236/101 E; 236/DIG. 1; 237/80

[58] Field of Search .................. 137/59, 62, 426, 137/448; 119/73, 78, 79, 80; 237/80; 251/11; 236/101 E, DIG. 1

[56] References Cited

U.S. PATENT DOCUMENTS

| | | | |
|---|---|---|---|
| 221,031 | 10/1879 | Campbell | 137/448 |
| 846,424 | 3/1907 | Pelmulder | 137/448 |
| 1,820,473 | 8/1931 | Milone | 137/62 |
| 1,852,246 | 4/1932 | Lecarpentier | 137/62 |
| 2,101,338 | 12/1937 | Lovekin | 236/101 E |
| 2,214,844 | 9/1940 | Van Keuren et al. | 137/62 |
| 2,477,138 | 7/1949 | Olson | 119/80 |
| 2,521,794 | 9/1950 | Harvey et al. | 137/426 |
| 2,581,045 | 1/1952 | Rhoads | 236/101 E |
| 2,634,746 | 4/1953 | Newton | 251/11 |
| 2,715,420 | 8/1955 | Stearns | 236/101 E |
| 2,805,660 | 9/1957 | Coleman, Jr. et al. | 236/101 E |
| 3,004,748 | 10/1961 | Sprouse et al. | 137/426 |
| 3,176,707 | 4/1965 | Wilson | 137/448 |
| 3,196,899 | 7/1965 | Lattemann | 251/11 |
| 3,361,156 | 1/1968 | Klingle, Sr. | 137/448 |
| 3,584,642 | 6/1971 | Wilson | 137/448 |
| 3,618,625 | 11/1971 | Walters | 137/62 |
| 4,586,532 | 5/1986 | Tsolkas | 137/426 |
| 4,763,682 | 8/1988 | Gardner et al. | 137/62 |

FOREIGN PATENT DOCUMENTS 648186   9/1962   Canada .................. 137/448

*Primary Examiner*—George L. Walton
*Attorney, Agent, or Firm*—William W. Haefliger

[57] ABSTRACT

For use with a watering trough fill control valve having float structure located to rise as water is filled into the trough via the valve, and to effect closing of the valve when the trough is filled to predetermined extent, the float structure located to fall as water level lowers in the trough, the float structure controlling a water inlet subject to freezing in closed position in winter, comprising an apparatus operatively connectible with the float structure for biasing the structure, so that it cannot completely close off ingress of water at the inlet as ambient temperature drops below water freezing level; the apparatus including a bimetallic control element.

13 Claims, 1 Drawing Sheet

WATERING THROUGH FILL VALVE CONTROL

BACKGROUND OF THE INVENTION

This invention relates generally to control of water level in a watering trough, i.e., typically a cattle watering trough. More particularly, it concerns overcoming problems that arise with operation of fill control valves, due to freezing conditions.

A fill control valve for a watering trough is typically float controlled. As water fills into the trough via the control valve, a float rises to shut off water inflow via an inlet nipple at the valve. Conversely, when the water level drops, due to cattle drinking, water resumes inflow into the trough via the inlet nipple. It is found that, under freezing conditions, the inlet valve freezes up, and rising and lowering of the float becomes blocked. There is need for means enabling the float valve to operate normally during both above and below freezing conditions.

SUMMARY OF THE INVENTION

It is a major object of the invention to provide a simple and effective apparatus meeting the above need. As will be seen, such apparatus, in accordance with the invention, is provided to be operatively connectible with float structure of the watering trough flow valve, so that it cannot completely close off ingress of water at the inlet as ambient temperature drops below water freezing level. As will be seen, such apparatus typically involves a bimetallic control element, which is temperature responsive.

Another object is to provide the bimetallic element in operative association with an arm via which bias is transmitted to the float structure; and typically, the arm has an end portion configured for support by a housing for said float structure. The float itself may then be biased by the arm, the arm having sliding engagement with the float.

A further object is to provide for rapid, easy installation of the arm in the trough, as by tongue and groove attachment of the arm to the trough.

These and other objects and advantages of the invention, as well as the details of an illustrative embodiment, will be more fully understood from the following specification and drawings, in which:

DRAWING DESCRIPTION

FIG. 1 is an elevation showing the invention as applied to a watering trough having a water inlet controlling fill valve; and FIG. 2 is a section taken on lines 2—2 of FIG. 1.

DETAILED DESCRIPTION

Figure 1:
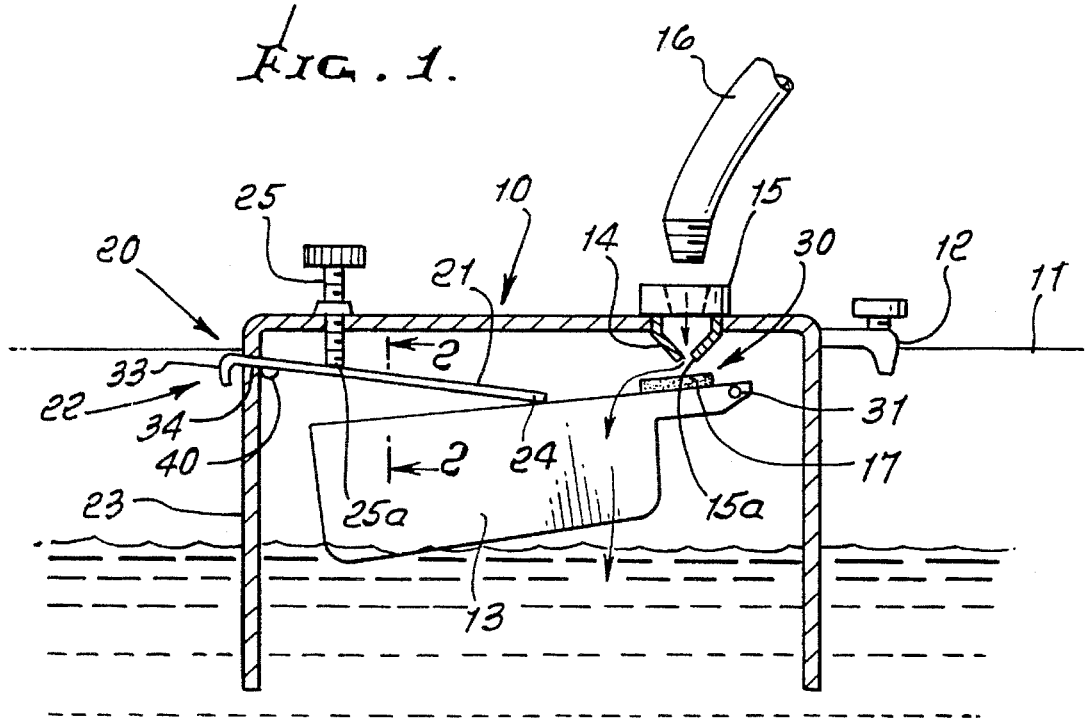

In FIG. 1, a fill valve 30 includes housing 10, which clamps into a watering trough 11, at 12. In the housing is a pivoted float 13. A water inlet nipple 14 on the top wall of the housing has a connection at 15 for the end of a garden hose 16, so the hose is usually connected to the nipple, and water is supplied under pressure.

When the trough is full of water, the float 13 rises; and a stopper 17 on the float closes against the open lower end 15a of the nipple, shutting off the inlet flow. The problem is that, in winter, the inlet valve freezes up, and lowering of the float (as the water level drops in the trough, due to cattle drinking), and rising of the float, are sometimes blocked.

In accordance with the invention, apparatus generally indicated at 20 biases the float near the freezing temperature (32°), so that it cannot rise further and completely close off water ingress at the lower end of the nipple, whereby water can then continuously trickle in at below freezing temperatures, preventing freeze up.

Apparatus 20, as shown, includes a temperature responsive bimetallic arm (or metal strip) 21. End 22 of the arm is attached to the housing wall 23. The projecting end 24 of the arm engages the top of the float. An adjustable set screw 25 engages the arm at 25a, as shown.

In warmer weather (above 32°), the arm end 24 rises away from the float, allowing it to rise and close the stopper 17 against the inlet nipple, whereby inflow is stopped when tank water level rises enough. In colder weather (32° and below), the arm end 24 lowers to engage the float and block its rising to completely close off the flow, i.e., the adjustment, via set screw 25, is such that water can trickle in, to prevent freeze up. Since the freeze temperature is different at different altitudes, the adjustment 25 is used to set the position and tensioning of the arm 21 vis-a-vis the float.

The fill valve 30, as described, may be considered to include the float structure and inlet nipple 14. A pivot for the float arm or structure is indicated at 31, and pivotally connects the float arm to housing 10.

The end 33 of arm 21 is turned to pivotally retain the arm to the trough wall 23. A slot 34 in wall 23 passes the arm 21, as shown. A dimple 40 on the arm blocks its leftward endwise movement.

Figure 2:
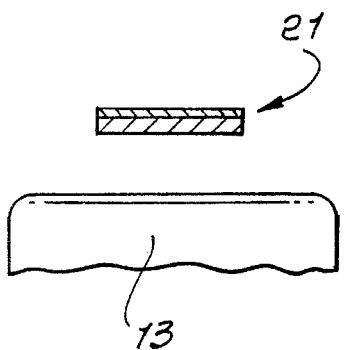

FIG. 2 shows the bimetallic strip structure of that metal arm 21. A sliding contact of that arm with the float is provided at 24.

We claim:

1. A watering trough fill control valve assembly having a float structure located to rise as water is filled into the trough via the valve, and to effect closing of the valve when the trough is filled to a predetermined level, the float structure then located to fall as the water level lowers in the trough to normally open the float valve, the float structure controlling a water inlet subject to a freezing condition, the improvement comprising:

a) an apparatus operatively connectible with the float structure for biasing said structure, so that it cannot completely close off ingress of water at said inlet as ambient temperature drops below a water freezing level, b) said apparatus including an arm and a bimetallic control element associated therewith, said arm having one end portion supported by a housing for receiving said float structure, said arm having another end portion slidably engaging and biasing said float structure along a portion thereof, said arm having an intermediate portion and there being adjustable control means for engaging said arm intermediate portion, to compensate for differences in water freezing temperature levels at different altitudes, whereby the float structure is biased against the predetermined fill level to maintain said water inlet open to allow water ingress at said inlet under freezing conditions as the bimetallic control element is affected by the freezing conditions.

2. The improvement of claim 1 wherein said bimetallic element is located on said arm, whereby bias is transmitted to said float structure.

3. The improvement of claim 2 wherein said arm one end portion is angled for pivoted support by said housing.

4. The improvement of claim 1 including said control valve in operative association with said apparatus.

5. The improvement of claim 4 wherein said control valve includes a stopper carried by the float structure to move upwardly as the arm other end portion slides toward the stopper.

6. The improvement of claim 1 wherein said adjustable control means includes an element to adjust the position of said bimetallic element.

7. The improvement of claim 1 wherein said adjustable control means includes a set screw carried by a housing for said float structure.

8. The improvement of claim 7 including a hose connection on the housing and associated with said inlet, to supply water under pressure to said inlet.

9. In combination, a) a carrier adapted for attachment to a watering trough, b) a float, pivotally mounted to the carrier to rise as the trough water level rises, and to fall as the trough water level falls, c) supply water flow controlling valve means operatively associated with said float and carrier to close as the float rises and to open as the float falls, d) and temperature responsive means for preventing complete closing of the valve means when ambient temperature is below freezing and for allowing complete closing of the valve means when ambient temperature is above freezing, e) whereby supply water flows at a reduced rate through said valve means and into the trough during freezing temperature conditions despite float rising seeking to close the valve means, and whereby supply water flow through said valve means and into the tank is blocked during above freezing temperature conditions in response to float rising seeking to close the valve means when the trough is full, f) said temperature responsive means including an arm and a bimetallic control element associated with said arm, said arm having one end portion supported by said carrier for said float, said arm having another end portion slidably engaging and biasing said float along a portion thereof, and said arm having an intermediate portion, there being adjustable control means for engaging said intermediate portion, to compensate for differences in water freezing temperature levels at different altitudes, whereby the float is biased against the rising water level to maintain water flow through said valve means under freezing conditions as the bimetallic control element is affected by the freezing conditions.

10. The combination of claim 9 wherein said arm is positioned to block rising of the float to completely close the valve means during freezing ambient temperature conditions.

11. The combination of claim 9 wherein said carrier comprises a housing extending about said float and said bimetallic control element.

12. The combination of claim 9 wherein said adjustable control means is located to adjust the position of said temperature responsive means relative to the carrier.

13. The combination of claim 12 wherein said adjustable control means comprises a set screw.

* * * * *